(12) United States Patent
Prakash

(10) Patent No.: US 6,671,801 B1
(45) Date of Patent: Dec. 30, 2003

(54) REPLICATION OF COMPUTER SYSTEMS BY DUPLICATING THE CONFIGURATION OF ASSETS AND THE INTERCONNECTIONS BETWEEN THE ASSETS

(75) Inventor: Alok Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,119

(22) Filed: Mar. 31, 2000

(51) Int. Cl.[7] .............................................. G06F 15/177
(52) U.S. Cl. ........................................ 713/1; 709/220
(58) Field of Search ........................ 707/200; 709/220; 713/1; 714/5

(56) References Cited

U.S. PATENT DOCUMENTS

| | | | | |
|---|---|---|---|---|
| 5,819,020 A | * | 10/1998 | Beeler, Jr. ...................... 714/5 |
| 5,832,225 A | * | 11/1998 | Hacherl et al. ............. 709/223 |
| 6,108,697 A | * | 8/2000 | Raymond et al. ........... 709/218 |
| 6,163,856 A | * | 12/2000 | Dion et al. ..................... 714/4 |
| 6,240,416 B1 | * | 5/2001 | Immon et al. ................ 707/10 |
| 6,301,612 B1 | * | 10/2001 | Selitrennikoff et al. ..... 709/220 |
| 6,321,239 B1 | * | 11/2001 | Shackelford ................ 707/206 |
| 6,405,294 B1 | * | 6/2002 | Hayter ........................ 711/162 |

* cited by examiner

Primary Examiner—Thomas Lee
Assistant Examiner—Albert Wang
(74) Attorney, Agent, or Firm—Fish & Richardson P.C.

(57) ABSTRACT

Techniques for replicating a computer system include identifying information concerning the configuration of a first computer system and using the identified information, to duplicate the configuration of the first system in a second computer system. All of the data stored in the memory of first computer system is copied and stored in memory associated with the second computer system.

25 Claims, 4 Drawing Sheets

REPLICATION OF COMPUTER SYSTEMS BY DUPLICATING THE CONFIGURATION OF ASSETS AND THE INTERCONNECTIONS BETWEEN THE ASSETS

BACKGROUND

This invention relates to the replication of computer systems.

A number of different computer systems, components, and configurations are used to support a World Wide Web Internet site. A typical combination may include a network, server hardware, specialized software and access codes. A particular combination that an entity uses is referred to as a POD. PODs can vary in size and complexity based upon such factors as the amount of data transmitted, the speed of data transfer, and particular limitations or requirements of hardware.

While a POD may be suitable for a particular application, it might not be suitable for an application that demands different resources and/or configurations. One approach to test whether a POD can support a new application is to reproduce a scaled-down version of the new application and use a separate POD, called a staging POD, to simulate the characteristics of the production POD intended to be used for the full-scale application.

This approach allows some degree of testing, but because the staging POD is not an exact simulation of the production POD, new problems might be discovered only when the application is deployed on the actual production hardware in the production configuration.

DESCRIPTION

Figure 1:
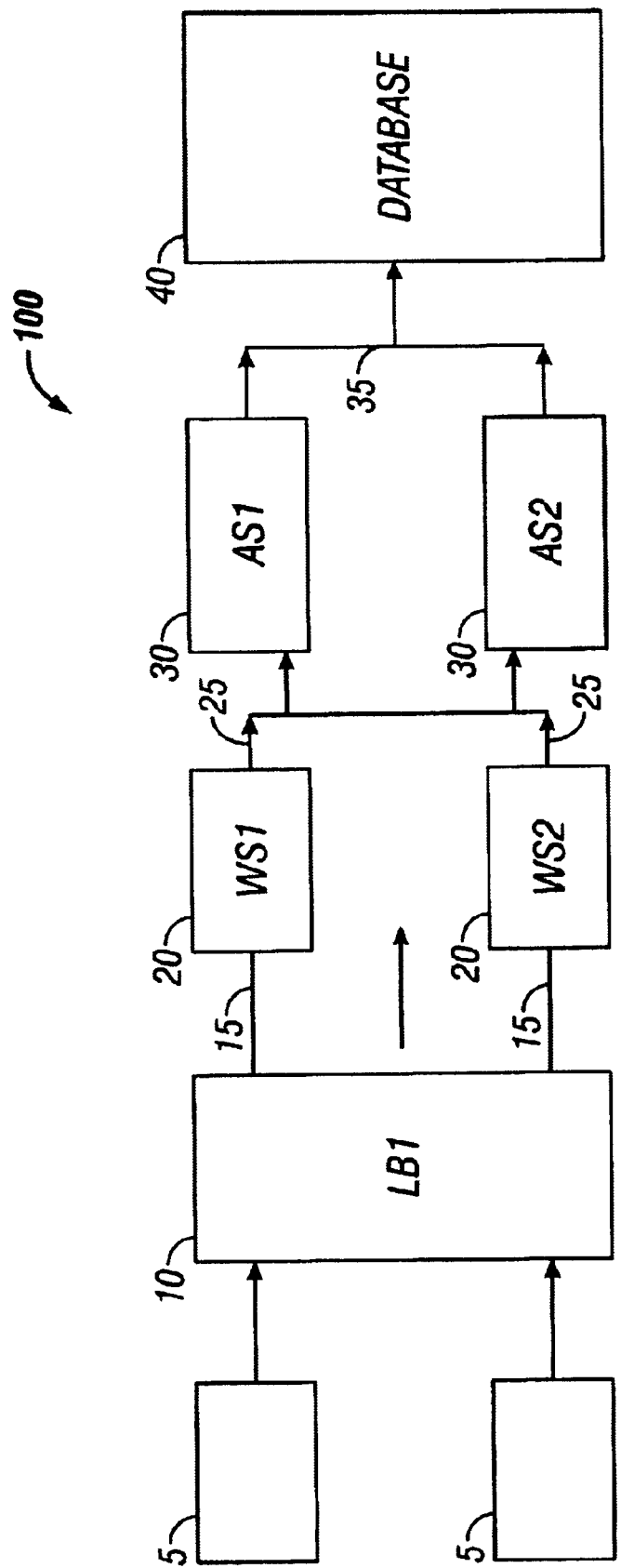
FIG. 1 illustrates an exemplary POD.

As shown in FIG. 1, an exemplary production POD 100 (POD1) that is to be duplicated includes a load balancer 10 that can be implemented, for example, as a computer or central processing unit (CPU). The load balancer 10 receives requests from client systems 5. The client systems 5 can be, for example, computers equipped with Web browsers linked to the Internet. Numerous client systems 5 may request links to a particular Web site.

Load balancer 10 allocates the requests among one or more Web servers 20 through connections 15. Web servers 20 can be implemented as computers equipped to run a Web application platform such as Microsoft IIS, Apache, AOL Server or Netscape Enterprise.

The load balancer 10 can direct requests to the server 20 most capable of handling the request. For example, depending on how the servers 20 are configured, one server may be more suited than another to handle a request. The difference may be because one may have more resources available, or it may be suited to handle certain types of content in a more efficient manner.

Web servers 20 may not be equipped to support every function performed on the Web site. In a typical POD, the Web servers 20 may be linked through a network 25 to application servers 30, which can be implemented, for example, as computers, processors or mainframes equipped to provide the required supporting functions. Application servers 30 link multiple systems and applications over diverse hardware and operating systems. Application servers 30 can be associated with an object framework, such as Enterprise JavaBeans, or Component Object Model, which enable the servers to provide an integrated development environment.

Application servers 30 also can be used as traffic controllers in database-intensive situations, taking requests from Web servers 20 and extracting data from one or more databases 40 through connections 35. To perform this function application servers 30 provide standardized interfaces with databases 40, such as Open Database Connectivity (ODBC) or Java Database Connectivity (JDBC), or vendor-based interfaces such as SQL (Structured Query Language), or various interfaces available from companies such as Oracle or Informix.

Figure 2:
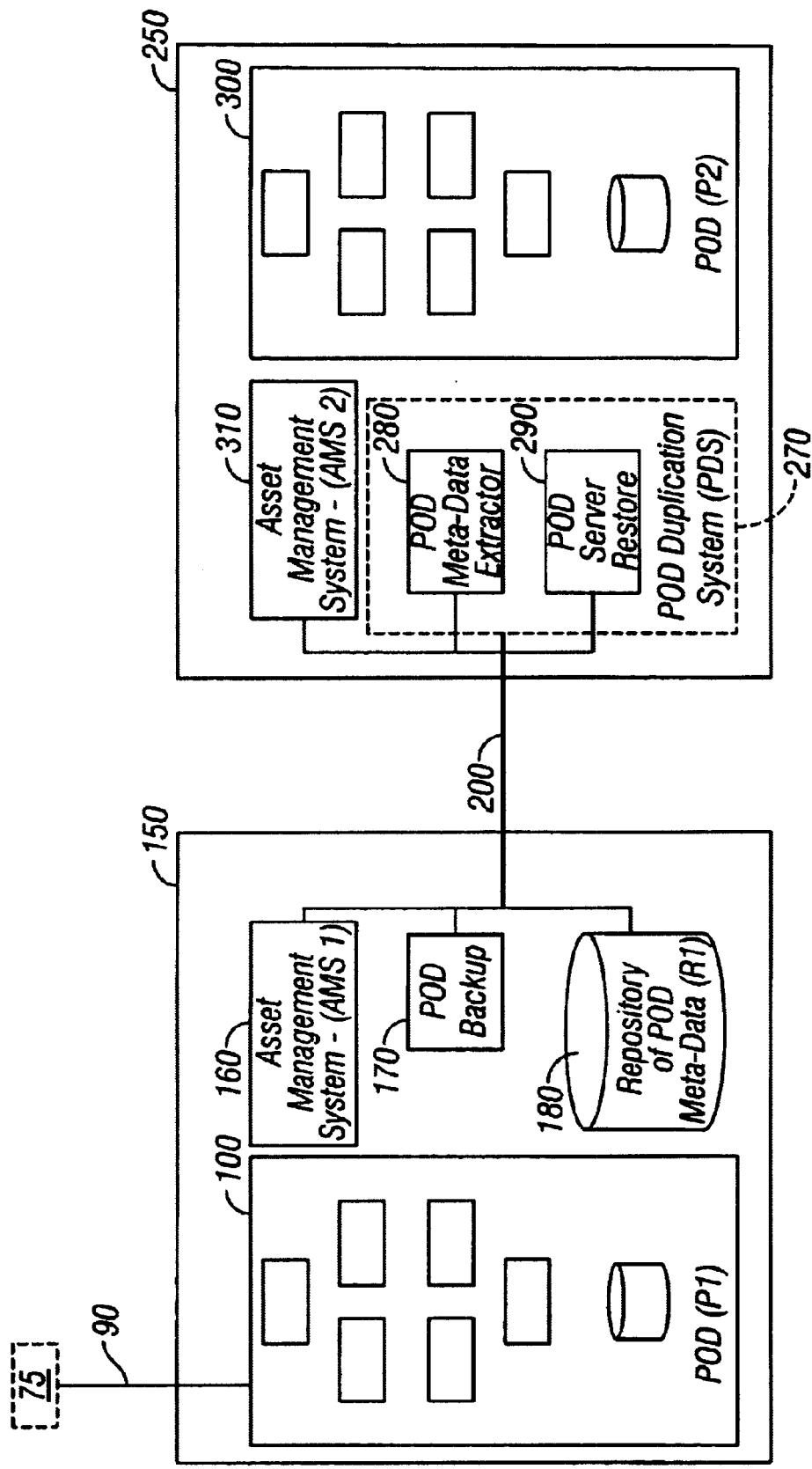
FIG. 2 illustrates an exemplary POD duplication system.

As shown in FIG. 2, POD1 100 is located within a production data center 150. The data contained in POD1 100 can come from outside sources 75 through a Virtual Private Network or other type of data communication medium 90 outside the production data center 150. More typically, however, the production data center 150 is a self-contained unit requiring no input from outside sources 75. Production data center 150 can contain a number of PODs in addition to POD1 100 and other devices not associated with any particular POD.

In addition to POD1 100, production data center 150 includes an asset management system 160. The asset management system 160 can be implemented, for example, as a processor or computer with associated memory that keeps a continuous record of how the hardware, network devices, and other computer resources ("assets") within the data center 150 are being used. Additionally, the asset management system 160 allocates and records the assets granted to POD1 100 such as the number and type of computers, routers, switches and the operating systems and software versions used.

A POD backup 170 is connected to the asset management system 160. The POD backup 170 has a processor and a storage medium that can include, for example, such storage devices as hard disks and tape drives. The POD backup 170 is configured to duplicate and store a copy of the data stored on the servers 20, 30 and databases 40 within POD1 100.

The production data center also includes a POD meta-data repository 180. The meta-data repository 180 is a storage medium that is configured to store particular information referred to as meta-data. Meta-data captures information about the POD1 100 assets that is not already available in the asset management system 160. Such information may include, for example, access codes and the network connections between the various assets in POD1 100.

FIG. 2 also shows a staging data center 250. This second data center 250 can be the same as the production data center 150, in which case the production POD would be located in the same data center as the staging POD. Alternatively, the staging data center 250 can be located remotely from the production data center 150. The following discussion assumes the latter case of separate data centers.

A data communication link 200 is established between the production 150 and staging 250 data centers. This link can be any digital communication medium, such as a fiber optic network, a combination of high-capacity trunk lines or a satellite wireless network. The asset management system 160, the POD backup system 170 and the meta-data repository 180 are connected to the data communication link 200.

The staging data center 250, like the production data center 150, is also an array of assets including various servers, storage and network devices. The staging data center 250 includes a POD duplication system, a computer system, which further includes a POD meta-data extractor 280 and POD server restore system 290. The POD meta-data extractor 280 can be implemented, for example, as a computer or processor having associated memory that is directly connected to the data communication link 200. The meta-data extractor 280 is configured to receive data from the production data center 150 through the communication link 200, and to send instructions from the staging data center 250 to the production data center 150.

The POD server backup system 290 also can be implemented, for example, as a computer or processor having associated memory directly connected to the data communication link 200. The POD server backup system 290 and the POD meta-data extractor 280 can be implemented as a single computer, but to illustrate their functional differences it is assumed that the backup system 290 and the meta-data extractor 280 are embodied in separate units. The POD backup server system 290 is coupled to the POD meta-data extractor 280, and together they form the integrated POD duplication system 270.

The POD duplication system 270 as connected to an asset management system 2 310 at the staging site. Asset management system 2 310 can be implemented in the same manner as the asset management system 160 in the production data center 150. It performs an analogous function of keeping a continuous record of the state of the assets present in the staging data center 250 and can allocate the assets to form a staging POD 300. Once, a staging POD 300 has been allocated, a connection is established between the POD duplication system 270 and the staging POD 300.

Figure 3:
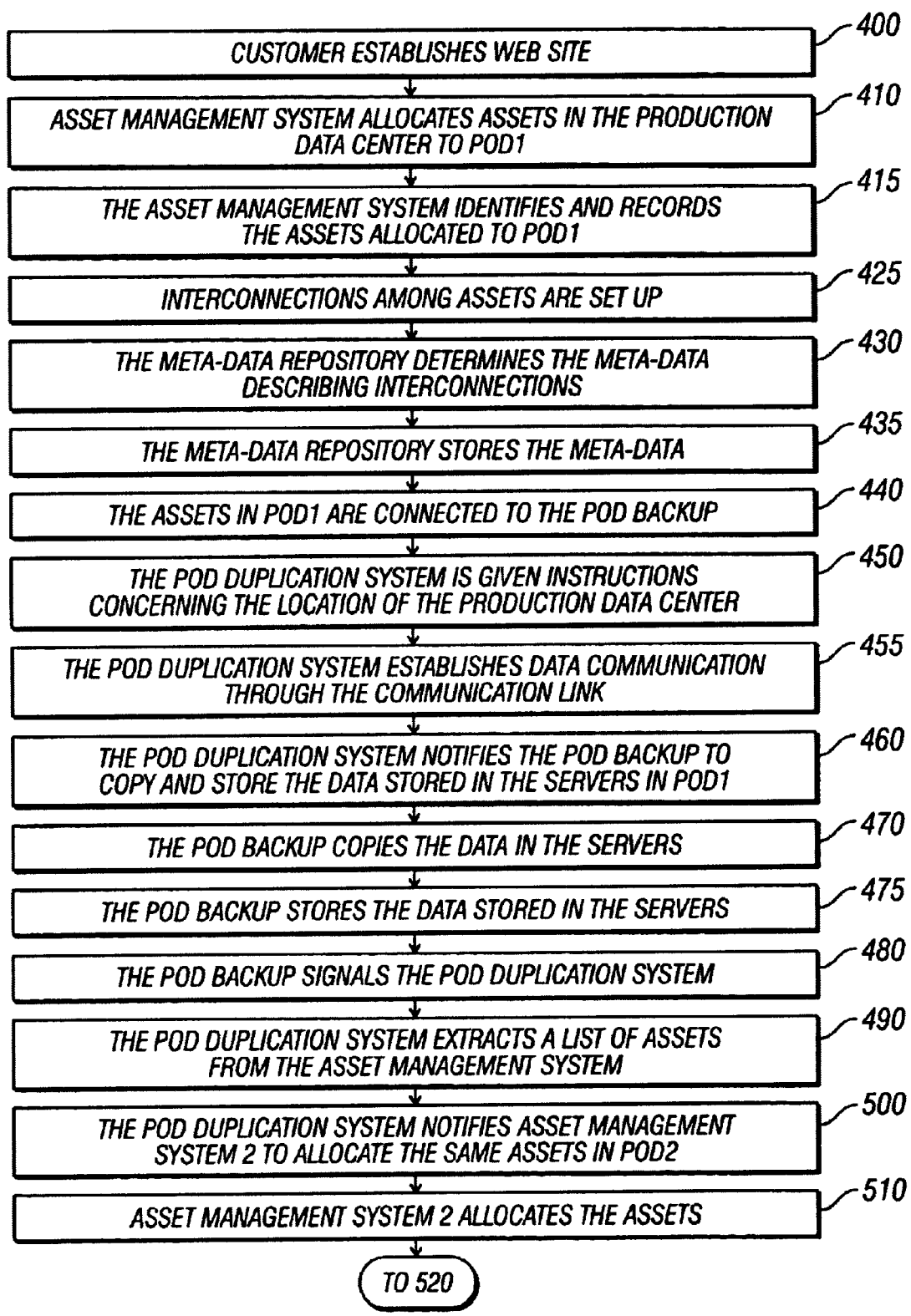
FIG. 3 is a flow chart illustrating an exemplary POD duplication process.
Figure 3:
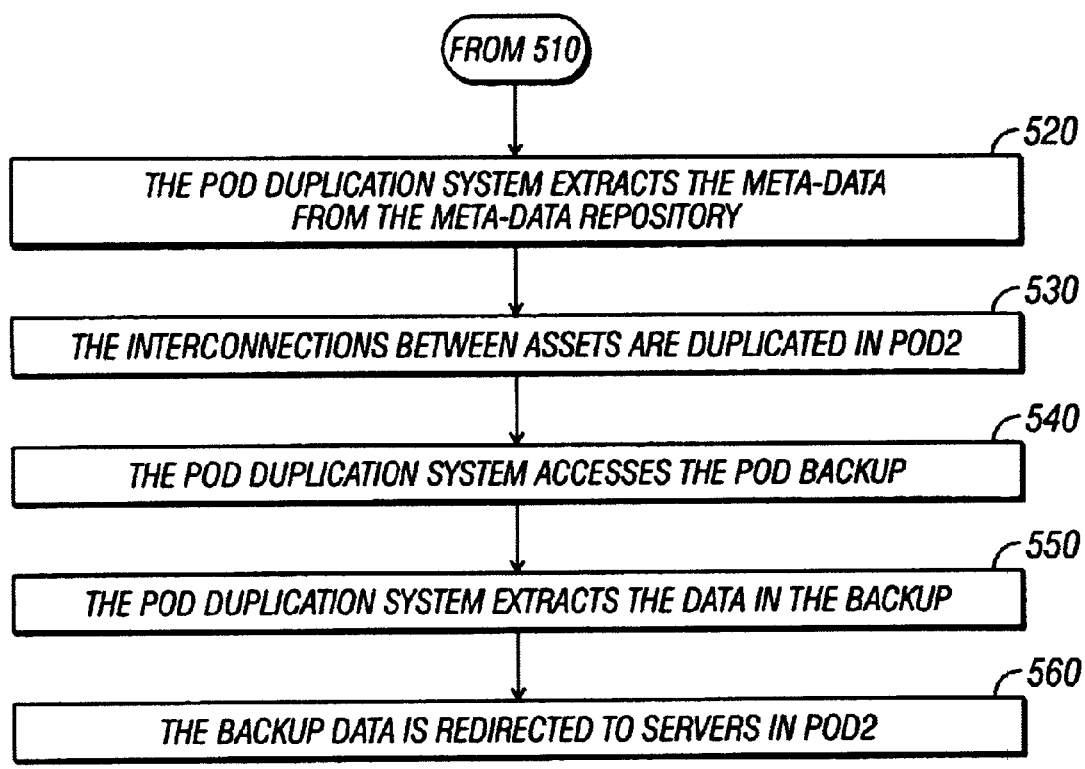

A process of POD duplication is described with reference to FIG. 3. A customer 75 establishes 400 a Web site in the production data center 150. Alternatively, a customer can communicate information from a site already constructed through connection 90. In either case, the production configuration of the customer Web site initially is established in the production data center 150.

As the site is being constructed and various devices are used to support the Web site, the asset management system 160 allocates 410 hardware from the assets in the production data center 150 to the customer 75. The allocated assets form the POD1 100. The asset management system 160 also identifies and records 415 the assets allocated to POD1 100.

After the assets have been fully allocated, interconnections among the various load balancers 10 and servers 20, 30 and 40 are set up 425. The meta-data repository 180 determines 430 and stores 435 the meta-data describing the interconnections between assets in POD1 100. The assets in POD1 100 are then connected 440 to the POD backup 170.

In the staging data center 250, the POD duplication system 270 is given instructions 450 concerning the location of the production data center 150 and establishes 455 data communication through link 200. The POD duplication system 270 notifies 460 the POD backup 170 to copy and store the data stored in the servers 20, 30, 40 in POD1 100. The POD backup 170 then copies 470 and stores 475 the data stored in the servers 20, 30, 40 in POD1 100.

The POD backup 170 signals 480 the POD duplication system 270 when all the assets in POD1 100 have been copied and stored. The POD duplication system 270 extracts 490 a list of the assets in POD1 100 from the asset management system 160. The duplication system 270 executes software programs that operate across communication links called scripts. The scripts enable the extraction process to be automated.

The POD duplication system 270 notifies 500 asset management system 2 310 to allocate 510 the same assets as in POD1 100 to POD2 300 in the staging data center 250. The duplication system 270 proceeds to extract 520 the meta-data from the meta-data repository 180, and uses it to duplicate 530 the links between assets in POD2 300. To duplicate all of the data stored on the servers in POD1 100, the POD duplication system 270 accesses 540 the POD backup 170 in the production data center 150, extracts 550 the data in the backup 170 and re-directs 560 the data to the analogous server in POD2 300.

At this point, a mirror-image of the configuration of the assets in POD1 100 has been reproduced as POD2 300 in the staging data center 250. In addition, the meta-data describing POD1 100 and the information stored in memory devices in POD1 has been copied and stored in POD2.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM), readable by a general or special purpose programmable computer, for configuring and operating the computer when the storage medium is read by the computer to perform the functions described above.

The various support systems located in the production and staging data centers 150, 250 can be embodied in one or more devices depending upon the implementation.

Other implementations are within the scope of the following claims.

What is claimed is:

1. A method of duplicating a computer system comprising:
   identifying information concerning the configuration of a first computer system;
   automatically duplicating the configuration of assets of the first computer system and interconnections between the assets in a second computer system based on the identified information; and
   copying data stored in memory associated with the first computer system to memory associated with the second computer system.

2. The method of claim 1 further comprising:
   selecting the second computer system from among a plurality of computer systems wherein the second computer system has substantially the same components as the first computer system.

3. The method of claim 1 wherein copying data includes:
   copying all data stored in the first computer system memory and storing that data in a backup system; and
   copying the data from the backup system and storing that data in the second computer system memory.

4. The method of claim 1 wherein the first computer system is located within a first data center and the second computer system is located within a second data center separate from the first data center.

5. The method of claim 1 wherein the identified information defines hardware components of the first computer system.

6. The method of claim 5 wherein the identified information further defines network interconnections among components of the first computer system.

7. The method of claim 6 wherein the identified information further defines access information stored in the first computer system.

8. The method of claim 7 further comprising sending instructions from the second data center to the first data center, and subsequently communicating the identified information from the first data center to the second data center.

9. A system for duplicating a computer system comprising:

a first computer system with associated memory;

a second computer system with associated memory; and a computerized management system, having a data communication link to both the first and second computer systems, that is configured to identify information concerning the configuration of the first computer system, to duplicate the configuration of assets of the first computer system and interconnections between the assets in the second computer system using the identified information, and to transfer data from the memory associated with the first computer system to the memory associated with the second computer system through the data communication link.

10. The apparatus of claim 9 wherein the management system is configured to select the second computer system from among a plurality of computer systems wherein the second computer system has substantially the same components as the first computer system.

11. The apparatus of claim 9 further comprising:

a backup system configured to retrieve and store all data stored in the first computer system in response to instructions received from the management system.

12. The apparatus of claim 9 wherein the management system is configured to duplicate the configuration of the assets of the first computer system and the interconnections between the assets, the first computer system located within a first data center and the second computer system located within a second data center separate from the first data center.

13. The apparatus of claim 9 wherein the management system is configured to identify hardware components of the first computer system.

14. The apparatus of claim 13 wherein the management system is configured to identify operating systems used by the first computer system.

15. The apparatus of claim 14 wherein the management system is configured to identify network interconnections among components of the first computer system.

16. The apparatus of claim 15 wherein the management system is configured to identify access information stored in the first computer system.

17. An article comprising a computer-readable medium which stores computer-executable instructions for causing a computer system to:

identify information concerning the configuration of a first computer system;

automatically duplicate the configuration of assets of the first computer system and interconnections between the assets in a second computer system based on the identified information; and copy data stored in memory associated with the first computer system to memory associated with the second computer system.

18. The article of claim 17 that further stores instructions causing a computer system to:

select the second computer system from among a plurality of computer systems wherein the second computer system has substantially the same components as the first computer system.

19. The article of claim 17 that further stores instructions causing a computer system to:

copy all data stored in the first computer system memory and storing that data in a backup system; and copying the data from the backup system and storing that data in the second computer system memory.

20. The article of claim 17 wherein the first computer system is located within a first data center and the second computer system is located within a second data center separate from the first data center.

21. The article of claim 20 wherein the identified information concerns hardware components of the first computer system.

22. The article of claim 21 wherein the identified information concerns operating systems used by the first computer system.

23. The article of claim 22 wherein the identified information concerns interconnections among components of the first computer system.

24. The article of claim 23 wherein the identified information concerns access codes stored within the first computer system.

25. The article of claim 24 further including sending instructions from the second data center to the first data center and subsequently communicating the identified information from the first data center to the second data center.

* * * * *